United States Patent

Nagahara

[11] Patent Number: 5,966,251
[45] Date of Patent: Oct. 12, 1999

[54] IMAGING LENS

[75] Inventor: Akiko Nagahara, Omiya, Japan

[73] Assignee: Fuji Photo Optical Co., Ltd., Saitama, Japan

[21] Appl. No.: 09/044,136

[22] Filed: Mar. 19, 1998

[30] Foreign Application Priority Data

Mar. 26, 1997 [JP] Japan .................................. 9-093111
Mar. 13, 1998 [JP] Japan ................................ 10-082486

[51] Int. Cl.$^6$ .............................. G02B 9/34; G02B 9/00
[52] U.S. Cl. ....................... 359/773; 359/739; 359/771; 359/772
[58] Field of Search .................... 359/771, 772, 359/773, 739

[56] References Cited

U.S. PATENT DOCUMENTS

| | | | |
|---|---|---|---|
| 2,962,930 | 12/1960 | Johnson | 350/449 |
| 3,011,402 | 12/1961 | Johnson | 350/449 |
| 3,359,057 | 12/1967 | Ackroyd | 350/449 |
| 3,438,696 | 4/1969 | Ruben | 350/475 |
| 3,443,863 | 5/1969 | Ruben | 350/475 |
| 3,449,041 | 6/1969 | DeJager | 350/475 |
| 4,093,348 | 6/1978 | Yasukuni | 350/206 |
| 4,620,775 | 11/1986 | Fujioka | 350/449 |

FOREIGN PATENT DOCUMENTS

| | | | |
|---|---|---|---|
| 0205123 | 11/1983 | Japan | 359/773 |
| 0026715 | 2/1984 | Japan | 359/773 |
| 5-188284 | 7/1993 | Japan | G02B 9/16 |
| 8-5908 | 1/1996 | Japan | G02B 13/04 |
| 2131198 | 10/1983 | United Kingdom | 359/773 |

*Primary Examiner*—Georgia Epps
*Assistant Examiner*—David N. Spector
*Attorney, Agent, or Firm*—Snider & Chao, LLP; Ronald R. Snider

[57] ABSTRACT

Successively from an object side, a stop, a biconvex lens, a biconcave lens, a biconvex lens, and a meniscus lens having a convex surface directed onto the image side are disposed, while the image-side surfaces of the second and third lenses are set to have a predetermined range of power, thereby favorably correcting various kinds of aberration, such as distortion in particular, while reducing the size of the whole lens system. Disposed successively from the object side are a stop i, a first lens $L_1$ made of a biconvex lens, a second lens $L_2$ made of a biconcave lens, a third lens $L_3$ made of a biconvex lens, and a fourth lens $L_4$ made of a meniscus lens having a convex surface directed onto the image side. These lenses satisfy the following conditional expressions:

$$0.4 < R_5 f < 2.0$$

$$0.4 < |R_7|/f < 2.2$$

wherein $R_5$ is a radius of curvature of the surface of the second lens on the image side;

$R_7$ is a radius of curvature of the surface of the third lens on the image side; and f is a composite focal length of the whole system.

4 Claims, 11 Drawing Sheets

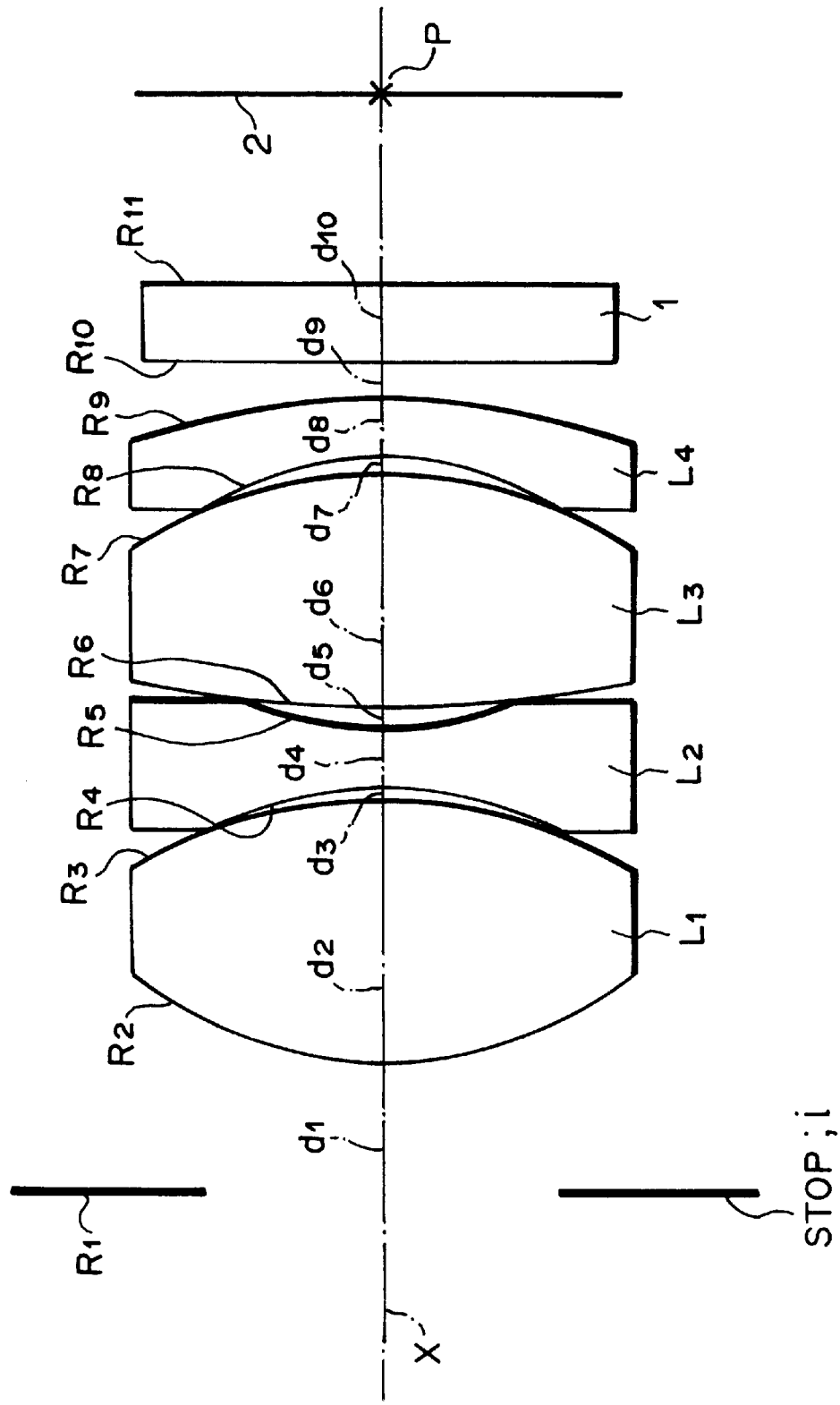

EXAMPLE 1
F/2.85

EXAMPLE 1
ω=19.0°

EXAMPLE 1
ω=19.0°

FIG.3　　　EXAMPLE 1 (COMA)
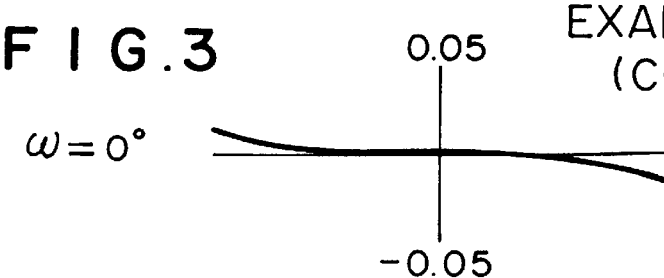
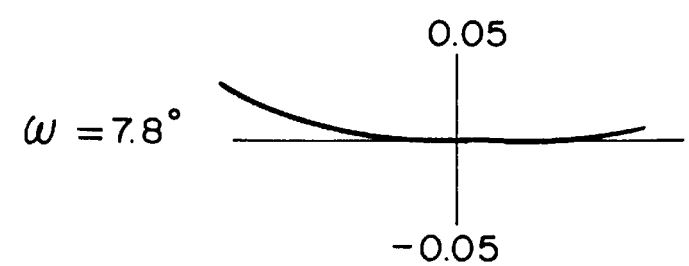
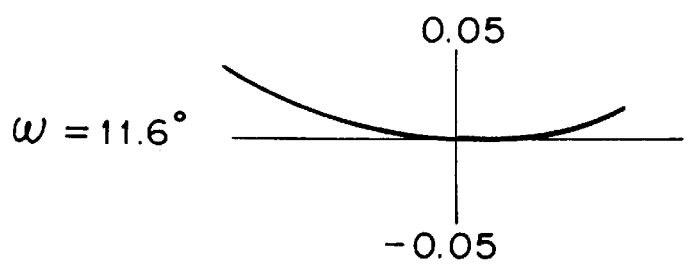
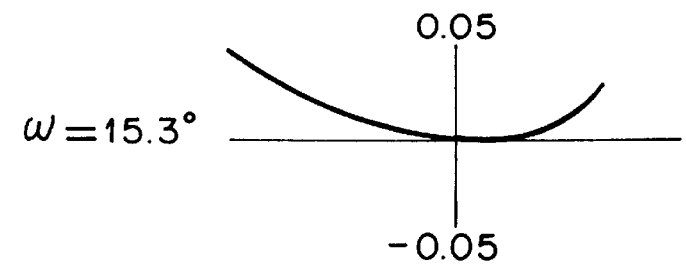
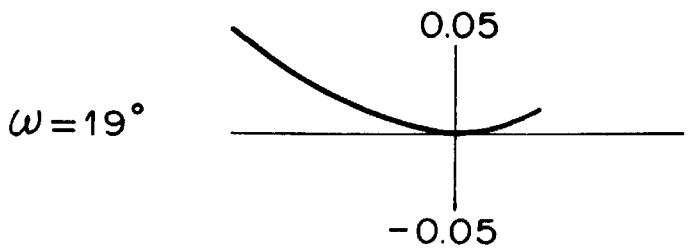

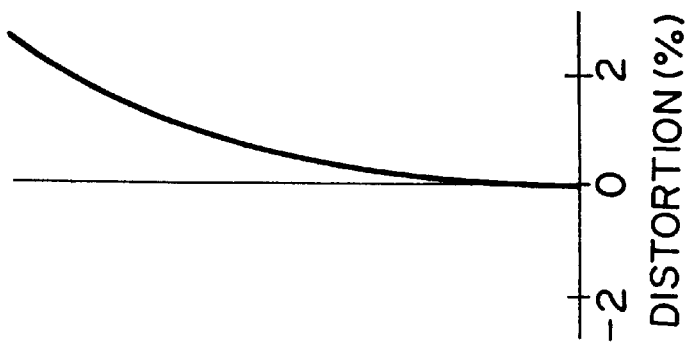
FIG. 4C EXMPLE 2 ω=18.3°
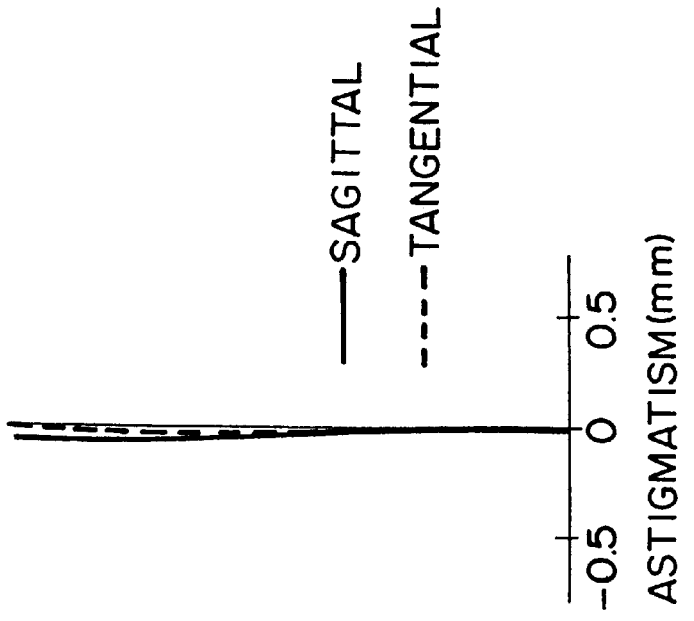
FIG. 4B EXAMPLE 2 ω=18.3°
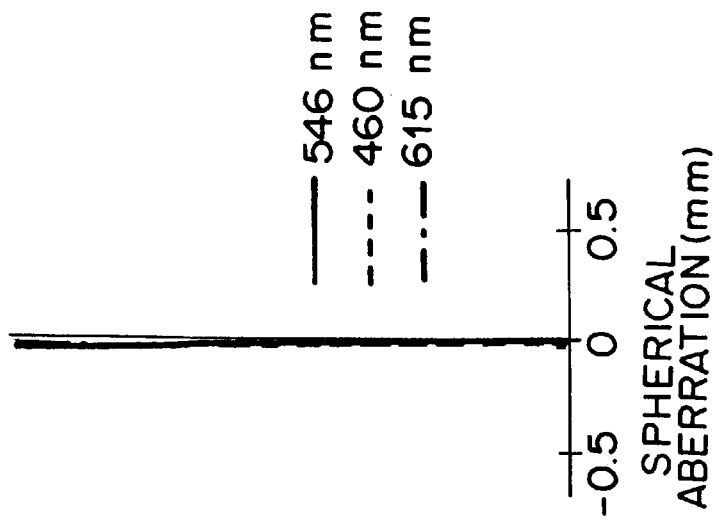
FIG. 4A EXAMPLE 2 F/2.85

FIG. 5
EXAMPLE 2 (COMA)
$\omega = 0°$
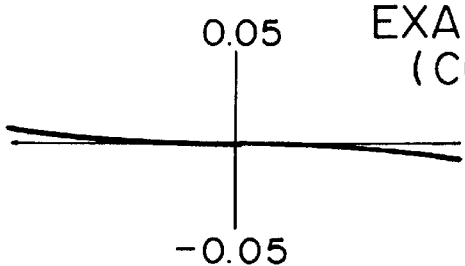
$\omega = 7.7°$
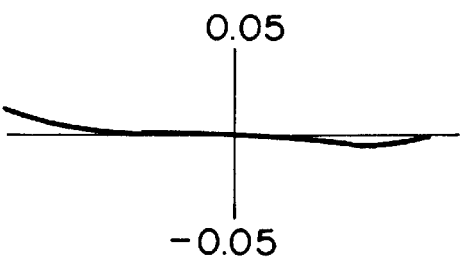
$\omega = 11.4°$
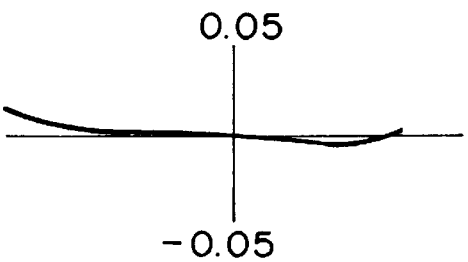
$\omega = 15°$
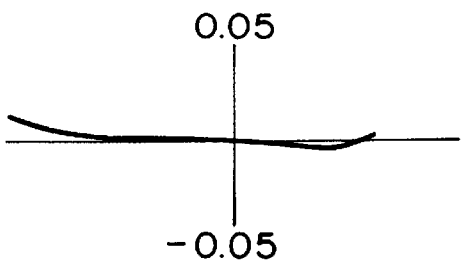
$\omega = 18.3°$
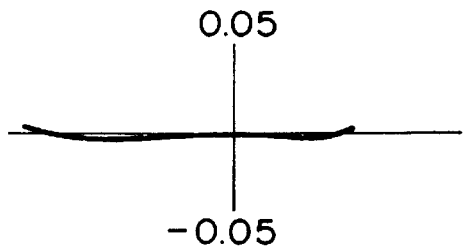

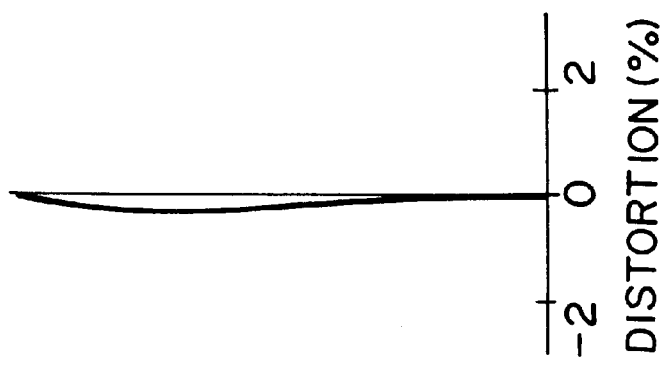
FIG. 6C EXAMPLE 3 ω=18.7°
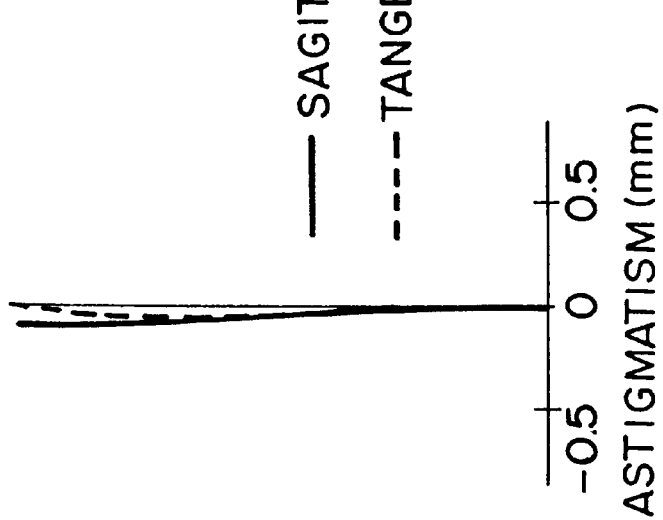
FIG. 6B EXAMPLE 3 ω=18.7°
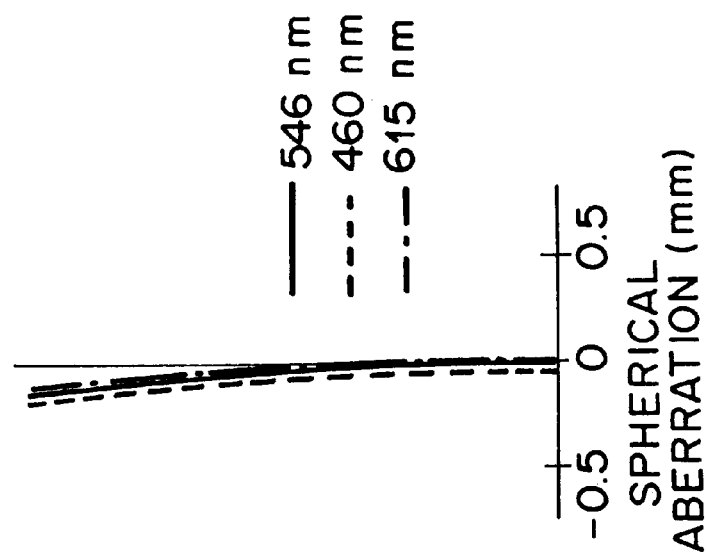
FIG. 6A EXAMPLE 3 F/2.85

FIG.7 EXAMPLE 3 (COMA)
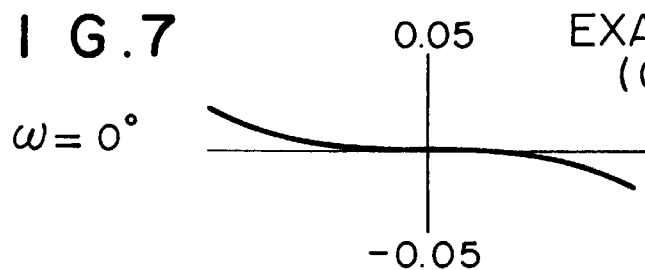
$\omega = 0°$
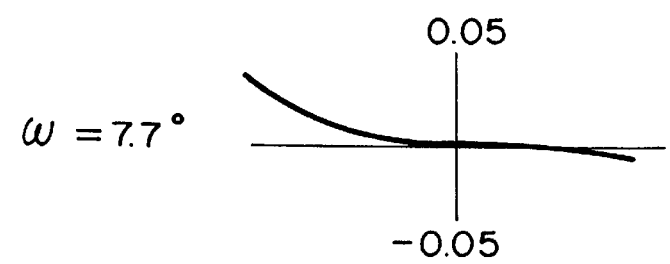
$\omega = 7.7°$
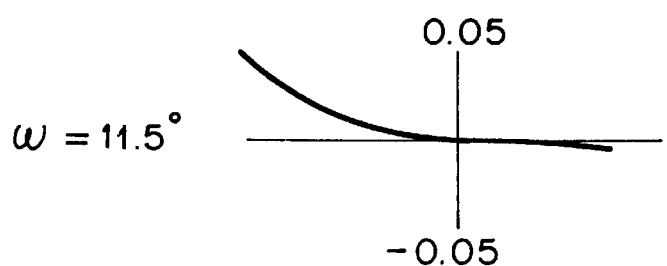
$\omega = 11.5°$
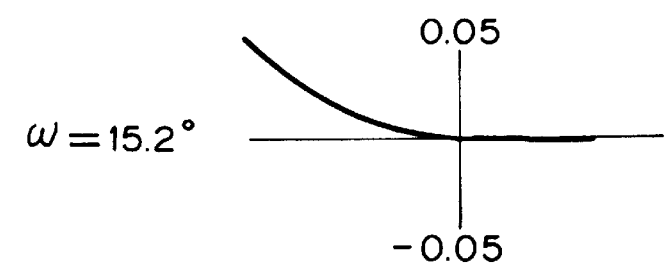
$\omega = 15.2°$
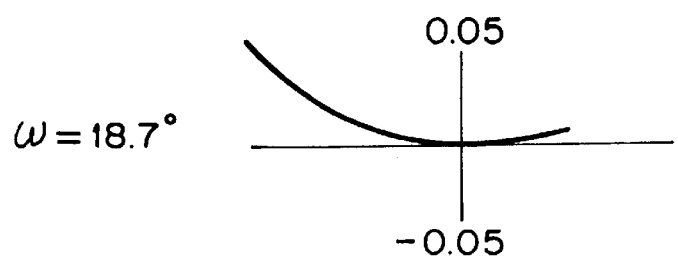
$\omega = 18.7°$

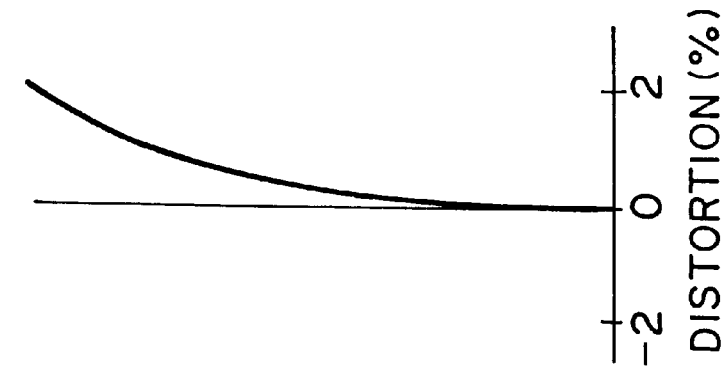
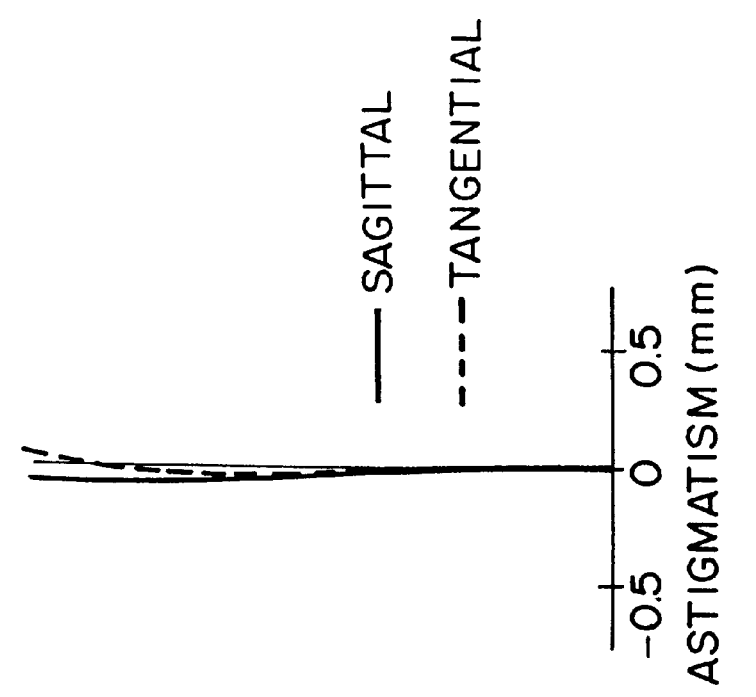
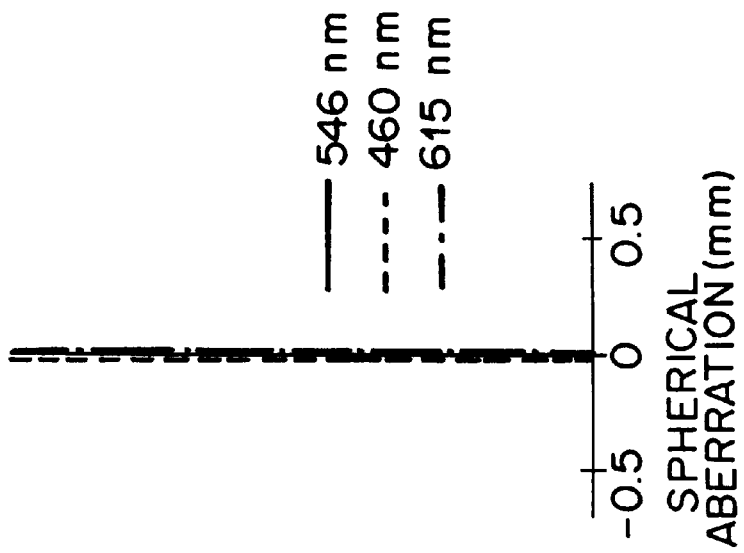

FIG. 9 EXAMPLE 4 (COMA)
$\omega = 0°$
$\omega = 7.7°$
$\omega = 11.5°$
$\omega = 15.1°$
$\omega = 18.4°$
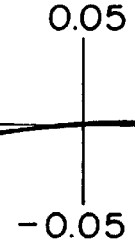

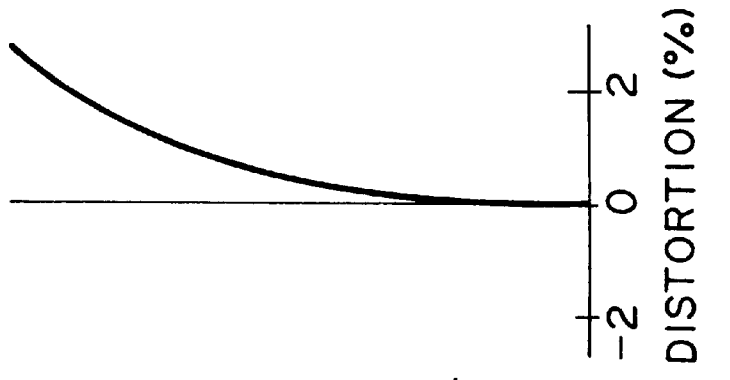
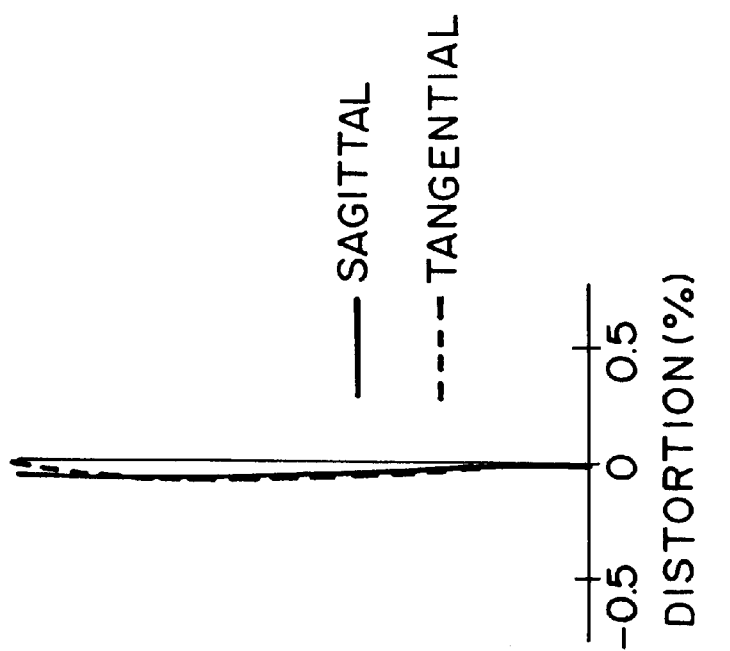
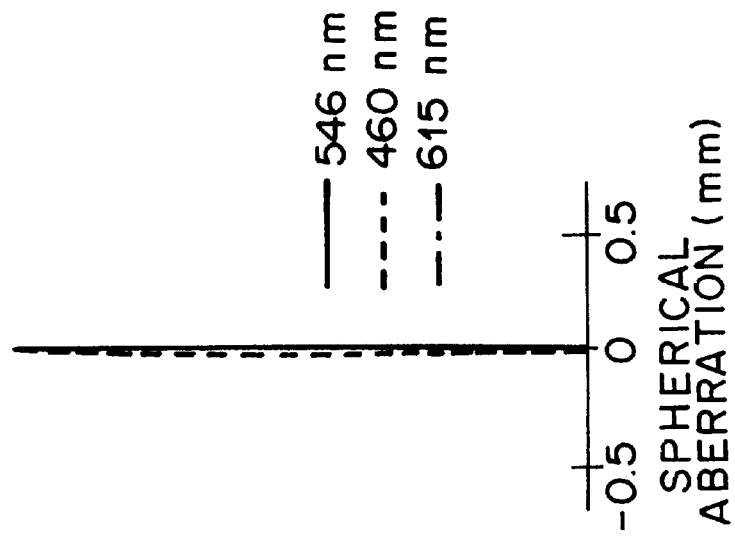

FIG.11 EXAMPLE 5 (COMA)
$\omega = 0°$
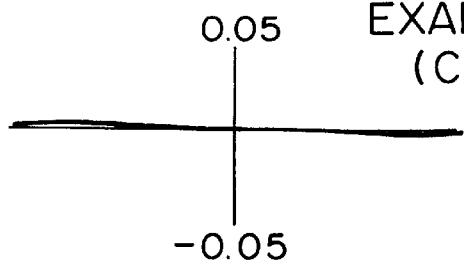
$\omega = 7.7°$
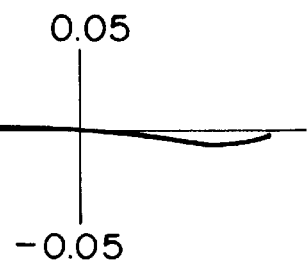
$\omega = 11.5°$
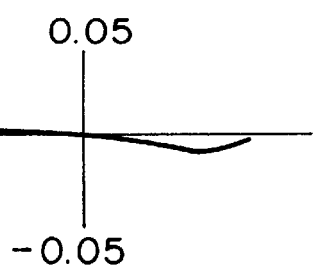
$\omega = 15°$
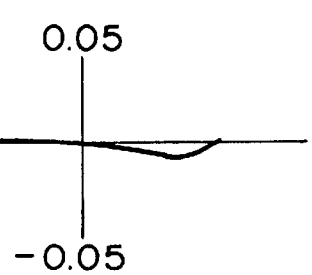
$\omega = 18.3°$
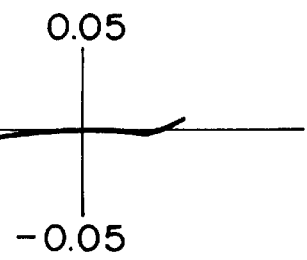

IMAGING LENS

RELATED APPLICATIONS

This application claims the priority of Japanese Patent Application No. 9-93111 (Title: Imaging lens) filed on Mar. 26, 1997 and Japanese Patent Application (Title: Imaging lens) filed on Mar. 13, 1998, which are incorporated herein by reference.

BACKGROUND OF THE INVENTION

1. Field of the Invention

The present invention relates to an imaging lens and, in particular, to an imaging lens suitable as a taking lens for a video camera or still video camera used for TV phone, door phone, monitoring purposes, or the like.

2. Description of the Prior Art

Recently, solid-state imaging devices have often been disposed on imaging surfaces of various kinds of video cameras and still video cameras. With the advance of technology, such solid-state imaging devices have been reducing their size year by year, while employing imaging lenses with smaller size and wider angle of view.

Conventionally known as the imaging lens used for the above-mentioned purposes is the one disclosed in Japanese Unexamined Patent Publication No. 8-5908 comprising four lens sheets and a stop disposed between the lenses.

In an imaging lens employed in a video camera or the like used for TV phone, door phone, monitoring purposes, and so forth, it is necessary for the whole lens system to have a small size in view of the space for its installation and the like.

When a stop is disposed between the lenses as in the imaging lens disclosed in the above-mentioned Japanese Unexamined Patent Publication No. 8-5908 in the case where the stop function is to be provided within the lens system, however, a large space is necessary in front of and behind the stop, thus increasing the size of the whole lens system.

Hence, in order to reduce the size of the whole lens system, the stop may be disposed on the image side or object side of the lens system. When the stop is disposed on the image side of the lens system, however, in order to secure an exit pupil position, back focus has to be elongated more than necessary. Accordingly, when the stop function is to be provided within the lens system, it is preferable that the stop be positioned on the object side of the lens system.

When the stop is disposed on the object side of the lens system, however, various kinds of aberration, such as distortion in particular, may increase too much to be easily corrected.

SUMMARY OF THE INVENTION

In view of the foregoing circumstances, it is an object of the present invention to provide a bright, small-sized imaging lens which can favorably correct various kinds of aberration, such as distortion in particular, even when a stop is disposed on the object side of the lens system.

The present invention provides an imaging lens comprising, successively from an object side, a stop, a first lens made of a biconvex lens, a second lens made of a biconcave lens, a third lens made of a biconvex lens, and a fourth lens made of a meniscus lens having a convex surface directed onto an image side; and satisfying the following conditional expressions (1) and (2):

$$0.4 < R_5/f < 2.0 \tag{1}$$

$$0.4 < |R_7|/f < 2.2 \tag{2}$$

wherein $R_5$ is a radius of curvature of the surface of the second lens on the image side;

$R_7$ is a radius of curvature of the surface of the third lens on the image side; and f is a composite focal length of the whole system.

Preferably, the imaging lens further satisfies the following conditional expression (3):

$$D_{air}/D < 0.6 \tag{3}$$

wherein

D is a sum of the distance from the stop to the surface of the fourth lens on the image side and a back focus; and $D_{air}$ is a sum of the distance of a total air gap between the stop and the surface of the fourth lens on the image side and a back focus.

Preferably, adjacent lenses among the first to fourth lenses are in edge contact with each other.

Also, the present invention provides an imaging lens comprising, successively from an object side, a stop, a first lens made of a biconvex lens, a second lens made of a biconcave lens, a third lens made of a biconvex lens, and a fourth lens made of a meniscus lens having a convex surface directed onto an image side; and satisfying the following conditional expressions (1) and (3):

$$0.4 < R_5/f < 2.0 \tag{1}$$

$$D_{air}/D < 0.6 \tag{3}$$

wherein $R_5$ is a radius of curvature of the surface of the second lens on the image side;

f is a composite focal length of the whole system;

D is a sum of the distance from the stop to the surface of the fourth lens on the image side and a back focus; and $D_{air}$ is a sum of the distance of a total air gap between the stop and the surface of the fourth lens on the image side and a back focus.

BRIEF DESCRIPTION OF THE DRAWINGS

FIG. 1 is a schematic view showing a basic lens configuration in accordance with Examples 1 to 5 of the present invention;

FIG. 3 is an aberration chart (for coma) of the lens in accordance with Example 1;

FIGS. 4A, 4B, and 4C are aberration charts (for spherical aberration, astigmatism, and distortion) of the lens in accordance with Example 2;

FIG. 5 is an aberration chart (for coma) of the lens in accordance with Example 2;

FIGS. 6A, 6B, and 6C are aberration charts (for spherical aberration, astigmatism, and distortion) of the lens in accordance with Example 3;

FIG. 7 is an aberration chart (for coma) of the lens in accordance with Example 3;

FIGS. 8A, 8B, and 8C are aberration charts (for spherical aberration, astigmatism, and distortion) of the lens in accordance with Example 4;

FIG. 9 is an aberration chart (for coma) of the lens in accordance with Example 4;

FIGS. 10A, 10B, and 10C are aberration charts (for spherical aberration, astigmatism, and distortion) of the lens in accordance with Example 5; and FIG. 11 is an aberration chart (for coma) of the lens in accordance with Example 5.

DESCRIPTION OF THE PREFERRED EMBODIMENTS

Figure 2A:
FIGS. 2A, 2B, and 2C are aberration charts (for spherical aberration, astigmatism, and distortion) of the lens in accordance with Example 1.

In the following, embodiments of the present invention will be specifically explained with reference to Examples 1 to 5.

EXAMPLE 1

FIG. 1 shows a basic lens configuration of Example 1. As depicted, the imaging lens in accordance with Example 1 is constituted by four sheets of lenses comprising, successively from the object side, a first lens $L_1$ made of a biconvex lens having a surface with a stronger curvature directed onto the image side, a second lens $L_2$ made of a biconcave lens having a surface with a stronger curvature directed onto the object side, a third lens $L_3$ made of a biconvex lens having a surface with a stronger curvature directed onto the image side, and a fourth lens $L_4$ made of a negative meniscus lens having a convex surface directed onto the image side; while a stop i is disposed on the object side of the first lens $L_1$, and a low-pass filter 1 is disposed on the image side of the fourth lens $L_4$. A luminous flux incident on the imaging lens along an optical axis X from the object side forms an image at an imaging position P of an imaging surface 2 of a solid-state imaging device.

Also, the imaging lens of Example 1 (as well as the imaging lens in each of Examples 2 to 5) satisfies the following conditional expressions (1) and (2):

$$0.4 < R_5/f < 2.0 \quad (1)$$

$$0.4 < |R_7|/f < 2.2 \quad (2)$$

wherein $R_5$ is a radius of curvature of the surface of the second lens on the image side;

$R_7$ is a radius of curvature of the surface of the third lens on the image side; and f is a composite focal length of the whole system.

The above-mentioned conditional expression (1) defines the range of the value obtained when the radius of curvature $R_5$ of the image-side surface of the second lens $L_2$ is divided by the composite focal length f of the whole system. When this conditional expression is satisfied, distortion and coma are favorably corrected, whereby sufficient performances are obtained. Namely, when the value of $R_5/f$ is below the lower limit thereof, not only distortion increases in the positive direction, but also it becomes hard to make the imaging lens. When the value of $R_5/f$ exceeds the upper limit, by contrast, not only distortion increases in the negative direction, but also coma cannot be corrected favorably.

The above-mentioned conditional expression (2) defines the range of the value obtained when the absolute value of the radius of curvature $R_7$ of the image-side surface of the third lens $L_3$ is divided by the composite focal length f of the whole system. When this condition is satisfied, distortion, coma, and chromatic aberration are favorably corrected, whereby sufficient performances can be obtained. Namely, when the value of $|R_7|/f$ is below the lower limit, not only distortion may increase in the positive direction, but also both the radius of curvature $R_7$ of the image-side surface of the third lens $L_3$ and the radius of curvature $R_8$ of the object-side surface of the fourth lens $L_4$ may become so small that it is difficult to make the imaging lens. When the value of $|R_7|/f$ is beyond the upper limit, by contrast, coma and chromatic aberration may become out of balance with each other.

Also, the imaging lens of Example 1 (as well as the imaging lens in each of Examples 2 to 5) satisfies the following conditional expressions (3):

$$D_{air}/D < 0.6 \quad (3)$$

wherein

D is a sum of the distance from the stop to the surface of the fourth lens $L_4$ on the image side and a back focus; and $D_{air}$ is a sum of the distance of a total air gap between the stop and the surface of the fourth lens on the image side and a back focus.

The above-mentioned conditional expression (3) defines the range of the value obtained when the sum $D_{air}$ of the distance of a total air gap between the stop and the image-side surface of the fourth lens $L_4$ and the back focus is divided by the sum D of the distance from the stop to the surface of the fourth lens $L_4$ on the image side and the back focus. When this conditional expression is satisfied, the whole length of the lens system can be shortened so as to reduce the size thereof.

The upper part of Table 1 (follows) shows radius of curvature R (mm) of each lens surface, center thickness of each lens and air gap between neighboring lenses d (mm), and refractive index n and Abbe number ν of each lens at e-line in Example 1.

In Table 1, as well as in Tables 2 to 6 which will be explained later, numbers referring to letters R, d, n, and ν successively increase from the object side.

Also, the lower part of Table 1 shows focal length f, back focus Bf, Fno, and half angle of view ω of the whole lens system, and values of $R_5/f$, $|R_7|/f$, and $D_{air}/D$.

In Example 1, as shown in the lower part of Table 1, the values of $R_5/f$, $|R_7|/f$, and $D_{air}/D$ are respectively 1.86, 0.76, and 0.44, thus satisfying each of the above-mentioned conditional expressions. Also, Fno is 2.85.

EXAMPLE 2

The imaging lens of Example 2 has a configuration substantially the same as that of the imaging lens of Example 1 except that the first lens $L_1$ is a biconvex lens having a surface with a stronger curvature directed onto the object side, and that the second lens $L_2$ is a biconcave lens having a surface with a stronger curvature directed onto the image side.

Further, in the imaging lens of Example 2 (as well as that in each of Examples 3 to 5), all of the first to fourth lenses $L_1$ to $L_4$ are preferably configured so as to be in edge contact with each other.

When all the lenses are configured to be in edge contact with each other, parts disposed between the lenses to hold the latter can be omitted, whereby the cost can be cut down.

The upper part of Table 2 (follows) shows radius of curvature R (mm) of each lens surface, center thickness of each lens and air gap between neighboring lenses d (mm), and refractive index n and Abbe number ν of each lens at e-line in Example 2. On the other hand, the lower part of Table 2 shows focal length f, back focus Bf, Fno, and half angle of view ω of the whole lens system, and values of $R_5/f$, $|R_7|/f$, and $D_{air}/D$.

In Example 2, as shown in the lower part of Table 2, the values of $R_5/f$, $|R_7|/f$, and $D_{air}/D$ are respectively 0.48, 0.61, and 0.42, thus satisfying each of the above-mentioned conditional expressions. Also, Fno is 2.85.

EXAMPLE 3

The imaging lens of Example 3 has a configuration substantially the same as that of the imaging lens of Example 1 except that the second lens $L_2$ is a biconcave lens having a surface with a stronger curvature directed onto the image side, and that the third lens $L_3$ is a biconvex lens having a surface with a stronger curvature directed onto the object side.

The upper part of Table 3 (follows) shows radius of curvature R (mm) of each lens surface, center thickness of each lens and air gap between neighboring lenses d (mm), and refractive index n and Abbe number ν of each lens at e-line in Example 3.

On the other hand, the lower part of Table 3 shows focal length f, back focus Bf, Fno, and half angle of view ω of the whole lens system, and values of $R_5/f$, $|R_7|/f$, and $D_{air}/D$.

In Example 3, as shown in the lower part of Table 3, the values of $R_5/f$, $|R_7|/f$, and $D_{air}/D$ are respectively 0.46, 2.14, and 0.42, thus satisfying each of the above-mentioned conditional expressions. Also, Fno is 2.85.

EXAMPLE 4

The imaging lens of Example 4 has a configuration substantially the same as that of the imaging lens of Example 1 except that the first lens $L_1$ is a biconvex lens having a surface with a stronger curvature directed onto the object side, and that the second lens $L_2$ is a biconcave lens having a surface with a stronger curvature directed onto the image side.

The upper part of Table 4 (follows) shows radius of curvature R (mm) of each lens surface, center thickness of each lens and air gap between neighboring lenses d (mm), and refractive index n and Abbe number ν of each lens at e-line in Example 4.

On the other hand, the lower part of Table 4 shows focal length f, back focus Bf, Fno, and half angle of view ω of the whole lens system, and values of $R_5/f$, $|R_7|/f$, and $D_{air}/D$.

In Example 4, as shown in the lower part of Table 4, the values of $R_5/f$, $|R_7|/f$, and $D_{air}/D$ are respectively 0.46, 0.67, and 0.42, thus satisfying each of the above-mentioned conditional expressions. Also, Fno is 2.85.

EXAMPLE 5

The imaging lens of Example 5 has a configuration substantially the same as that of the imaging lens of Example 1 except that the first lens $L_1$ is a biconvex lens having a surface with a stronger curvature directed onto the object side, and that the second lens $L_2$ is a biconcave lens having a surface with a stronger curvature directed onto the image side.

The upper part of Table 5 (follows) shows radius of curvature R (mm) of each lens surface, center thickness of each lens and air gap between neighboring lenses d (mm), and refractive index n and Abbe number ν of each lens at e-line in Example 5.

On the other hand, the lower part of Table 5 shows focal length f, back focus Bf, Fno, and half angle of view ω of the whole lens system, and values of $R_5/f$, $|R_7|/f$, and $D_{air}/D$.

In Example 5, as shown in the lower part of Table 5, the values of $R_5/f$, $|R_7|/f$, and $D_{air}/D$ are respectively 0.46, 0.51, and 0.42, thus satisfying each of the above-mentioned conditional expressions. Also, Fno is 2.85.

Figure 2B:
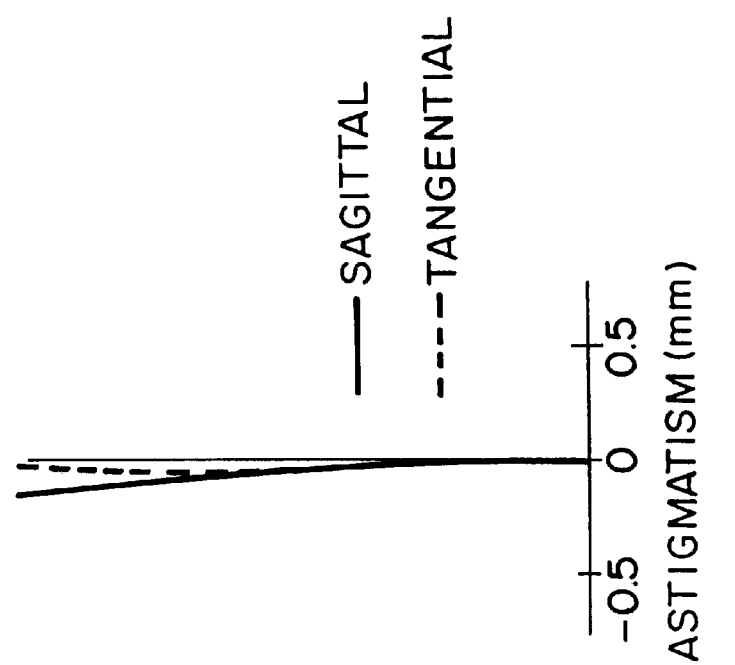
Figure 2C:
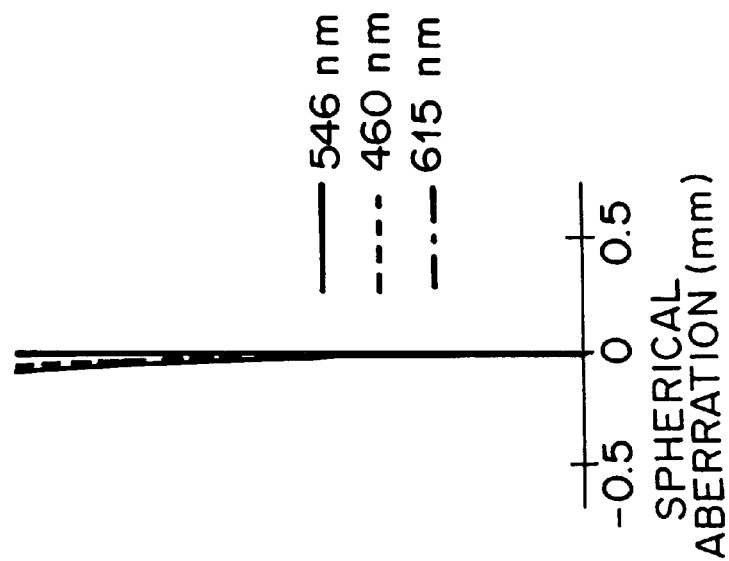

FIGS. 2(2A to 2C), 4(4A to 4C), 6(6A to 6C), 8(8A to 8C), and 10(10A to 10C) respectively show aberrations (spherical aberration, astigmatism, and distortion) of Examples 1 to 5; whereas FIGS. 3, 5, 7, 9, and 11 respectively show comas of Examples 1 to 5. In these aberration charts, ω indicates half angle of view. As can be seen from FIGS. 2 to 11, various kinds of aberration can be made favorable in these Examples.

In place of or together with the low-pass filter, an infrared-blocking filter or cover glass may be inserted between the imaging lens and the light-receiving surface of the solid-state imaging device.

As explained in the foregoing, since the stop is disposed on the object side of the lens system, the whole lens system can have a smaller size in the imaging lens in accordance with the present invention, whereby it can become favorable as the imaging lens for a video camera or the like used for TV phone, door phone, monitoring purposes, and so forth. Also, when the image-side surfaces of the second and third lenses have a predetermined range of power, various aberrations, such as distortion in particular, can be favorably corrected.

Further, when the relationship between the length of the lens system and air gaps therein is set to a predetermined range, the whole length of the lens system can be shortened so as to reduce the size of the whole lens system.

TABLE 1

| Surface | R | d | n | ν |
|---|---|---|---|---|
| 1 | (stop) | 1.3 | | |
| 2 | 5.680 | 3.0 | 1.80831 | 46.3 |
| 3 | −4.276 | 0.1 | | |
| 4 | −3.892 | 0.6 | 1.79192 | 25.5 |
| 5 | 13.000 | 0.7 | | |
| 6 | 28.402 | 2.4 | 1.83962 | 42.7 |
| 7 | −5.314 | 0.3 | | |
| 8 | −3.239 | 0.6 | 1.51978 | 51.9 |
| 9 | −8.686 | 0.1 | | |
| 10 | ∞ | 1.0 | 1.51825 | 63.8 |
| 11 | ∞ | | | | f = 7.0 mm  
Bf = 2.67 mm  
Fno = 2.85  
ω = 19.0°  
$R_5/f$ = 1.86  
$|R_7|/f$ = 0.76  
$D_{air}/D$ = 0.44

TABLE 2

| Surface | R | d | n | ν |
|---|---|---|---|---|
| 1 | (stop) | 1.3 | | |
| 2 | 4.003 | 2.7 | 1.83962 | 42.7 |
| 3 | −4.836 | 0.1 | | |
| 4 | −3.775 | 0.6 | 1.76858 | 29.8 |
| 5 | 3.338 | 0.2 | | |
| 6 | 13.383 | 2.4 | 1.83962 | 42.7 |
| 7 | −4.276 | 0.2 | | |
| 8 | −3.201 | 0.6 | 1.51978 | 51.9 |
| 9 | −7.230 | 0.1 | | |
| 10 | ∞ | 1.0 | 1.51825 | 63.8 |
| 11 | ∞ | | | | f = 7.0 mm  
Bf = 2.67 mm  
Fno = 2.85  
ω = 18.3°  
$R_5/f$ = 0.48

TABLE 2-continued

| Surface | R | d | n | ν |
|---|---|---|---|---|

$|R_7|/f = 0.61$
$D_{air}/D = 0.42$

TABLE 3

| Surface | R | d | n | ν |
|---|---|---|---|---|
| 1 | (stop) | 1.3 | | |
| 2 | 4.666 | 2.7 | 1.80831 | 46.3 |
| 3 | −4.578 | 0.1 | | |
| 4 | −3.922 | 0.6 | 1.65222 | 33.6 |
| 5 | 3.200 | 0.2 | | |
| 6 | 6.374 | 2.3 | 1.83962 | 42.7 |
| 7 | −15.000 | 0.3 | | |
| 8 | −4.117 | 0.6 | 1.55098 | 45.5 |
| 9 | −5.903 | 0.1 | | |
| 10 | ∞ | 1.0 | 1.51825 | 63.8 |
| 11 | ∞ | | | | f = 7.0 mm
Bf = 2.66 mm
Fno = 2.85
ω = 18.7°
$R_5/f = 0.46$
$|R_7|/f = 2.14$
$D_{air}/D = 0.42$

TABLE 4

| Surface | R | d | n | ν |
|---|---|---|---|---|
| 1 | (stop) | 1.3 | | |
| 2 | 4.018 | 2.6 | 1.83962 | 42.7 |
| 3 | −4.864 | 0.1 | | |
| 4 | −3.777 | 0.6 | 1.76168 | 27.3 |
| 5 | 3.200 | 0.4 | | |
| 6 | 10.879 | 2.5 | 1.83962 | 42.7 |
| 7 | −4.693 | 0.1 | | |
| 8 | −3.800 | 0.6 | 1.51978 | 51.9 |
| 9 | −8.203 | 0.1 | | |
| 10 | ∞ | 1.0 | 1.51825 | 63.8 |
| 11 | ∞ | | | | f = 7.0 mm
Bf = 2.66 mm
Fno = 2.85
ω = 18.4°
$R_5/f = 0.46$
$|R_7|/f = 0.67$
$D_{air}/D = 0.42$

TABLE 5

| Surface | R | d | n | ν |
|---|---|---|---|---|
| 1 | (stop) | 1.3 | | |
| 2 | 3.943 | 2.6 | 1.83962 | 42.7 |
| 3 | −4.810 | 0.1 | | |
| 4 | −3.601 | 0.6 | 1.74706 | 27.6 |
| 5 | 3.200 | 0.4 | | |
| 6 | 15.734 | 2.5 | 1.83962 | 42.7 |
| 7 | −3.600 | 0.1 | | |
| 8 | −3.200 | 0.6 | 1.62409 | 36.1 |
| 9 | −7.283 | 0.1 | | |
| 10 | ∞ | 1.0 | 1.51825 | 63.8 |
| 11 | ∞ | | | | f = 7.0 mm
Bf = 2.66 mm
Fno = 2.85
ω = 18.3°

TABLE 5-continued

| Surface | R | d | n | ν |
|---|---|---|---|---|

$R_5/f = 0.46$
$|R_7|/f = 0.51$
$D_{air}/D = 0.42$

What is claimed is:

1. An imaging lens comprising, successively from an object side, a stop, a first lens made of a biconvex lens, a second lens made of a biconcave lens, a third lens made of a biconvex lens, and a fourth lens made of a meniscus lens having a convex surface directed onto an image side; said imaging lens satisfying the following conditional expressions (1) and (2):

$$0.4 < R_5/f < 2.0 \qquad (1)$$

$$0.4 < |R_7|/f < 2.2 \qquad (2)$$

wherein $R_5$ is a radius of curvature of the surface of the second lens on the image side;

$R_7$ is a radius of curvature of the surface of the third lens on the image side; and f is a composite focal length of the whole system.

2. An imaging lens according to claim 1, further satisfying the following conditional expression (3):

$$D_{air}/D < 0.6 \qquad (3)$$

wherein

D is a sum of the distance from the stop to the surface of the fourth lens on the image side and a back focus; and $D_{air}$ is a sum of the distance of a total air gap between the stop and the surface of the fourth lens on the image side and a back focus.

3. An imaging lens according to claim 1, wherein adjacent lenses among the first to fourth lenses are in edge contact with each other.

4. An imaging lens comprising, successively from an object side, a stop, a first lens made of a biconvex lens, a second lens made of a biconcave lens, a third lens made of a biconvex lens, and a fourth lens made of a meniscus lens having a convex surface directed onto an image side; said imaging lens satisfying the following conditional expressions (4) and (5):

$$0.4 < R_5/f < 2.0 \qquad (4)$$

$$D_{air}/D < 0.6 \qquad (5)$$

wherein $R_5$ is a radius of curvature of the surface of the second lens on the image side;

f is a composite focal length of the whole system;

D is a sum of the distance from the stop to the surface of the fourth lens on the image side and a back focus; and $D_{air}$ is a sum of the distance of a total air gap between the stop and the surface of the fourth lens on the image side and a back focus.

* * * * *